United States Patent [19]

Imamura et al.

[11] Patent Number: 5,800,790
[45] Date of Patent: Sep. 1, 1998

[54] FILTER FOR TREATMENT OF CARBON-BASED PARTICLES IN EXHAUST GAS AND A DEVICE FOR SAID TREATMENT USING SAID FILTER

[75] Inventors: Masato Imamura, Tokyo; Kiichi Nakajima, Kokubunji; Katsumi Jindo; Toshio Asami, both of Toyokawa; Tatsuhiko Kato, Shinshiro; Kouichi Ushiroebisu, Okazaki; Yukio Aizawa, Kawasaki; Yasuo Sekido; Akira Goto, both of Yokohama; Tomonari Komiyama, Kawasaki, all of Japan

[73] Assignee: Sintokogio, Ltd., Nagoya, Japan

[21] Appl. No.: 718,997

[22] Filed: Sep. 24, 1996

[30] Foreign Application Priority Data

Sep. 25, 1995 [JP] Japan ................... 7-270464
Sep. 25, 1995 [JP] Japan ................... 7-270483

[51] Int. Cl.$^6$ ................... F01N 3/10
[52] U.S. Cl. ................... 422/174; 422/175; 422/178
[58] Field of Search ................... 422/174, 175, 422/178

[56] References Cited

U.S. PATENT DOCUMENTS

| | | | |
|---|---|---|---|
| 4,362,016 | 12/1982 | Papadopulos | 60/297 |
| 5,405,422 | 4/1995 | Ueda et al. | 422/174 |
| 5,409,669 | 4/1995 | Smith et al. | 422/174 |

FOREIGN PATENT DOCUMENTS

| | | | |
|---|---|---|---|
| 3-258911 | 11/1991 | Japan | F01N 3/02 |
| 4-109017 | 4/1992 | Japan | F01N 3/02 |
| 5-240023 | 9/1993 | Japan | F01N 3/02 |
| 5-240025 | 9/1993 | Japan | F01N 3/02 |
| 5-240026 | 9/1993 | Japan | F01N 3/02 |
| 6-26326 | 2/1994 | Japan | F01N 3/02 |
| 6-33734 | 2/1994 | Japan | F01N 3/01 |

*Primary Examiner*—Edward J. Cain
*Attorney, Agent, or Firm*—Limbach & Limbach L.L.P.

[57] ABSTRACT

A filter is provided for treating carbon-based particles in exhaust gas discharged from a diesel internal combustion engine, etc., said filter providing in addition to a high throughput capacity, excellent durability, and good economic and maintenance properties, and a device for treating carbon-based particles in exhaust gas having a high throughput capacity, the regeneration of which is easy. This filter is obtained by cutting an end face of a coiled material that is obtained by winding a sheet of a high-temperature resistant stainless steel having resistance heat-generating properties to produce fibers, gathering the thus-produced fibers to form a web, sintering the web, heat-treating the sintered web to form an alumina film on the surface of the sintered fibers, and optionally supporting a catalyst on the alumina film. In the device electrodes are fixed to the free ends of the filter and, when necessary, an electric current is applied from an electric current-supplying device to the electrodes to cause the filter to generate heat.

4 Claims, 10 Drawing Sheets

FILTER FOR TREATMENT OF CARBON-BASED PARTICLES IN EXHAUST GAS AND A DEVICE FOR SAID TREATMENT USING SAID FILTER

BACKGROUND OF THE INVENTION

1. The Field of the Invention

The present invention relates to a filter for a treatment of carbon-based particles in exhaust gas discharged from a diesel internal combustion engine, oven, boiler, etc., and to a device for a treatment of carbon-based particles in exhaust gas, said device consisting of one or more treating units for carbon-based particles using the filter.

2. Prior Art

Since a diesel internal combustion engine has a high energy efficiency and a good durability, it is generally used for transporting facilities such as cars, general power machinery, and the generation of electric energy. However, exhaust gas from internal combustion engines contains carbon-based particles mainly comprising soot and carbon mist, and thus creates environmental problems.

For measures against exhaust gas, for transporting facilities such as cars, engines and fuel injection systems have been improved and thereby the amount of carbon-based particles in the exhaust from diesel internal combustion engines can be reduced to some extent. However, since the decrease in carbon-based particles resulting from these measures is insufficient, there are methods for further decreasing the carbon-based particles, in which methods, such as in Japanese Patent Early-publication No. 6-33734, an oxidizing enzyme (enzyme for combustion) is utilized, or in which after the carbon-based particles are collected in a ceramic filter, they are ignited with an electric heater or burner, and then the particles are propagatively burned with combustion heat generated by the carbon-based particles themselves to remove them.

On the other hand, in combustion devices of fixed-type diesel engines, or industrial diesel engines, ovens, cogeneration systems, heat pumps, boilers, etc., a method of using dust-collecting equipment such as a cyclone or bag filter has been adopted for measures for exhaust gas.

However, the method in which an oxidizing catalyst (catalyst for combustion) is used or carbon-based particles are collected in a ceramic filter and the collected particles are burned to remove them, has problems in durability and economy. Specifically, in the method in which a ceramic filter is used, although the ratio of collected carbon-based particles is high, there are such problems wherein at regeneration due to the nonuniform generated heat in the filter produced by the combustion of the carbon-based particles and due to a high combustion temperature the filter breaks down or melts and wherein due to the accumulation in a filter of ash in exhaust gas the filter cannot be used for a long time.

In dust-collecting equipment such as a cyclone or bag filter used in combustion devices for fixed-type diesel engines or industrial diesel engines, ovens, boilers, etc., there are such problems wherein throughput capacity is low, devices are expensive, and the carbon-based particles collected must be subjected to a disposing treatment.

SUMMARY OF THE INVENTION

To resolve the above problems, the present invention was researched and conceived.

A first object of the invention resides in providing a filter for a treatment of carbon-based particles in exhaust gas, said filter having a high throughput capacity of carbon-based particles in exhaust gas from a diesel internal combustion engine or combustion equipment, and providing durability, and being good in its economy and maintenance.

A second object is to provide devices for treating carbon-based particles in exhaust gas, by which regeneration operation is easy, and which have a high throughput capacity of carbon-based particles.

To attain the first object, a filter of one embodiment of the present invention comprises a sintered body of high-temperature stainless steel fibers, which sintered body is obtained by end-cutting coiled material that is obtained by winding a sheet of a high-temperature heat-resistant stainless steel having resistance heat-generating properties, gathering the fibers to form a web, sintering the web, and heat-treating the sintered body to form an alumina coating on the surface of the sintered fibers.

Another embodiment has a constitution in which the sintered body of high-temperature resistant stainless steel fibers further supports a catalyst.

To attain the second object, one embodiment of the present invention has a second construction consisting of a housing of a device having an introduction part and a discharge part, a carbon-based particles-treating filter consisting of a sintered body of high-temperature resistant stainless steel, which filter is obtained by end-cutting coiled material wound with a sheet of a high-temperature resistant stainless steel having resistance heat-generating properties, and gathering the thus-produced fibers to form a web, sintering the web, and subjecting the sintered web to a heat-treatment to form an alumina coating on the surface of the sintered fibers, and electrodes fixed at free ends of the sintered body, and a device for applying an electric current to cause the carbon-based particles-treating filter to generate heat when necessary. In another embodiment of the present invention the filter further has a catalyst supported on the alumina coating.

The device for treating carbon-based particles of one embodiment of the present invention has one or more treating units, each of which has the second construction.

DESCRIPTIONS OF THE DRAWINGS

FIGS. 1 (a), (b), and (c) each shows a perspective view of an example of a filter for treating carbon-based particles of the present invention.

FIG. 2 (a) is an enlarged view of a part of a filter for treating carbon-based particles of the present invention.

FIGS. 2 (b) and (c) are each an enlarged cross-sectional view of a fiber of a sintered body of high-temperature resistant stainless steel fibers on which a catalyst is not supported.

FIGS. 2 (d) and (e) are each an enlarged cross-sectional view of a fiber of a sintered body of high-temperature resistant stainless steel fibers on which a catalyst is supported.

FIGS. 4 (a) and (b) are an enlarged perspective view and an enlarged cross-sectional view, respectively, of a fiber produced by the method shown in FIG. 3.

FIGS. 5 (a) and (b) are a longitudinal sectional side view and cross-sectional view, respectively, of an example of the device for treating carbon-based particles in exhaust gas of one embodiment of the present invention.

FIGS. 6 (a) and (b) are a longitudinal sectional side view and cross-sectional view, respectively, of an example of the device for treating carbon-based particles in exhaust gas of one embodiment of the present invention.

FIGS. 7 (a) and (b) are a longitudinal sectional side view and cross-sectional view, respectively, of an example of the device for treating carbon-based particles in exhaust gas of one embodiment of the present invention.

FIGS. 8 (a) and (b) are each a longitudinal sectional side view of an example of the device of the present invention in which a plurality of treating units for carbon-based particles are used.

FIGS. 9 (a) and (b) show the function of a filter of the present invention.

DETAILED DESCRIPTION OF THE INVENTION

Below the present invention will be explained by reference to the attached drawings.

Figure 1:
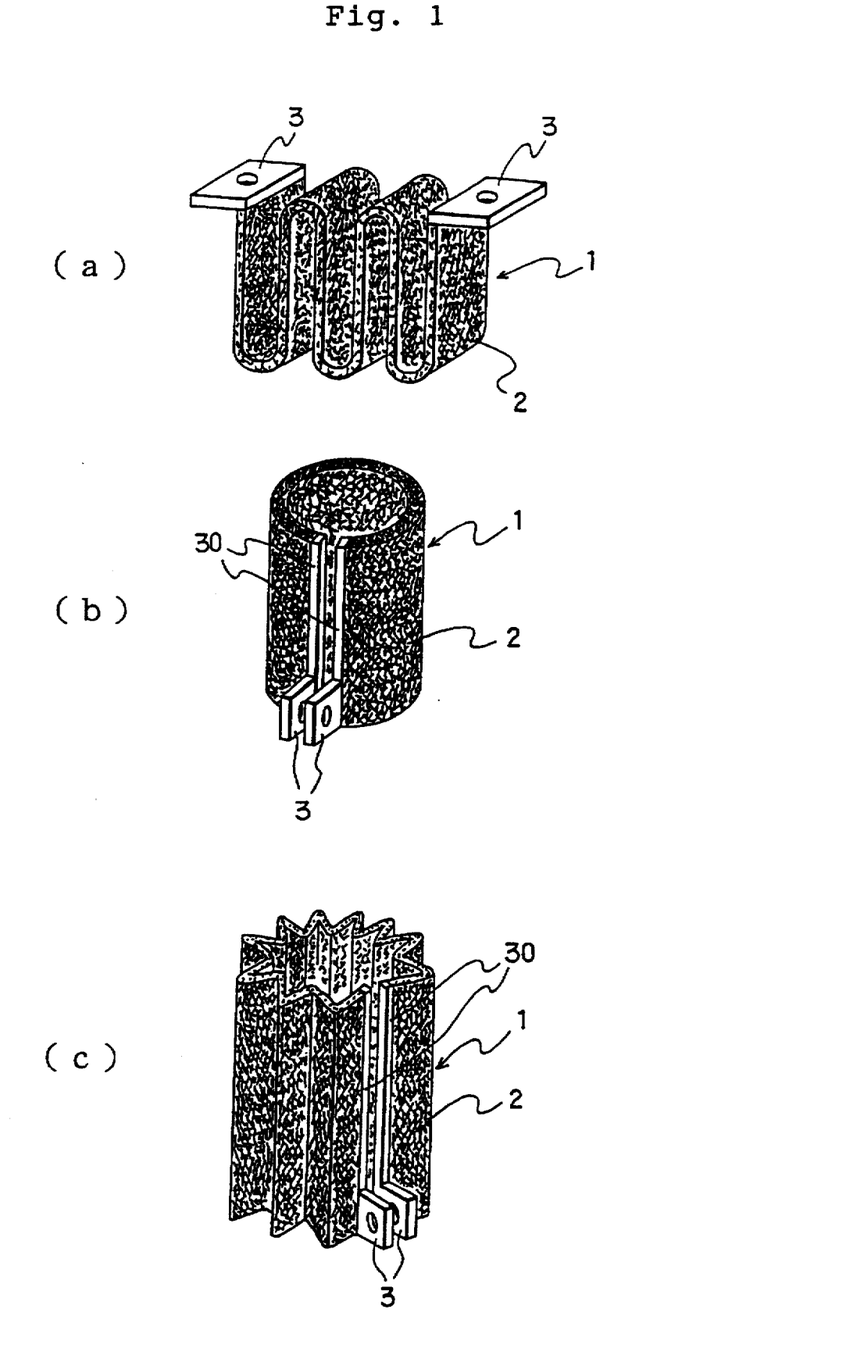
Figure 2:
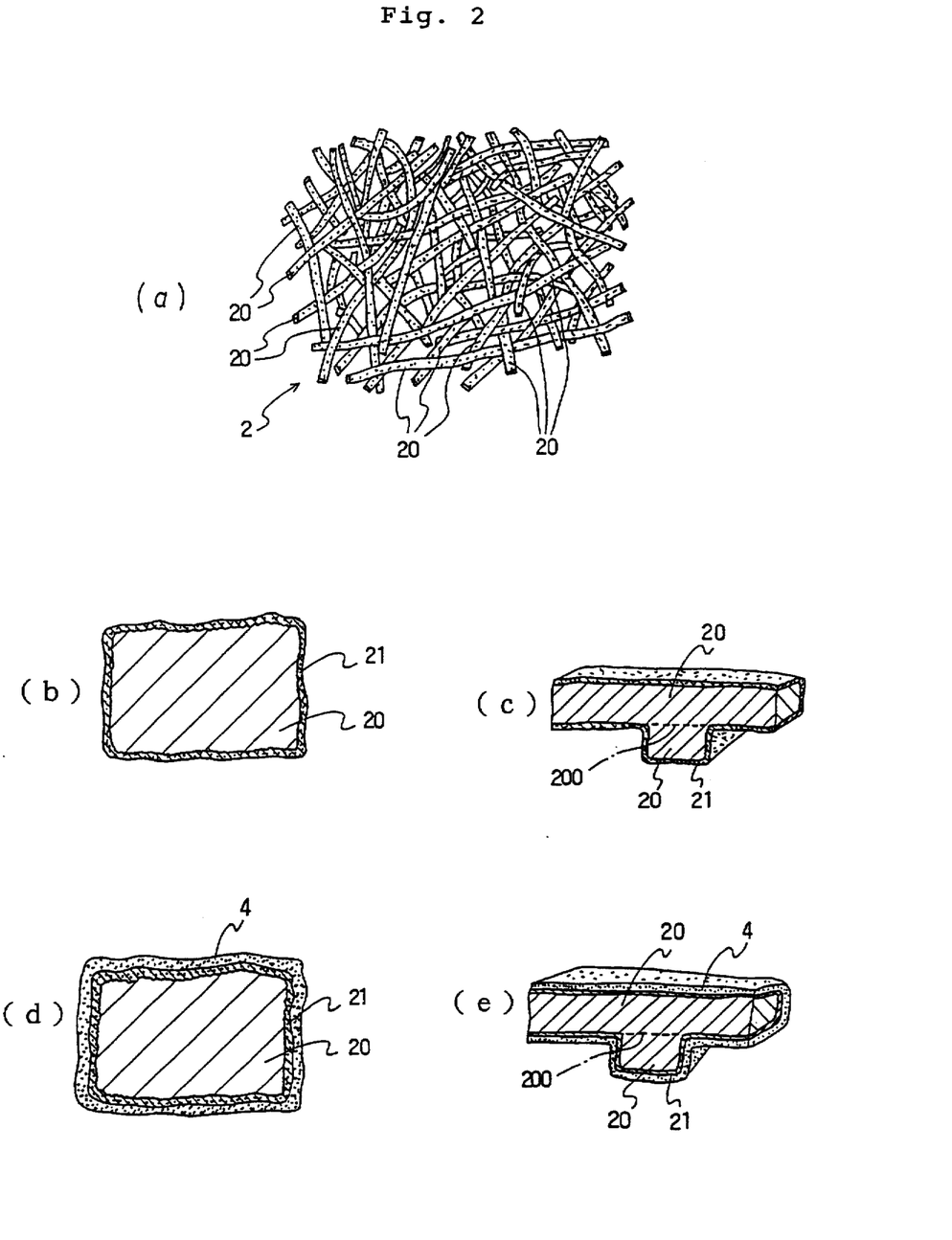
Figure 3:
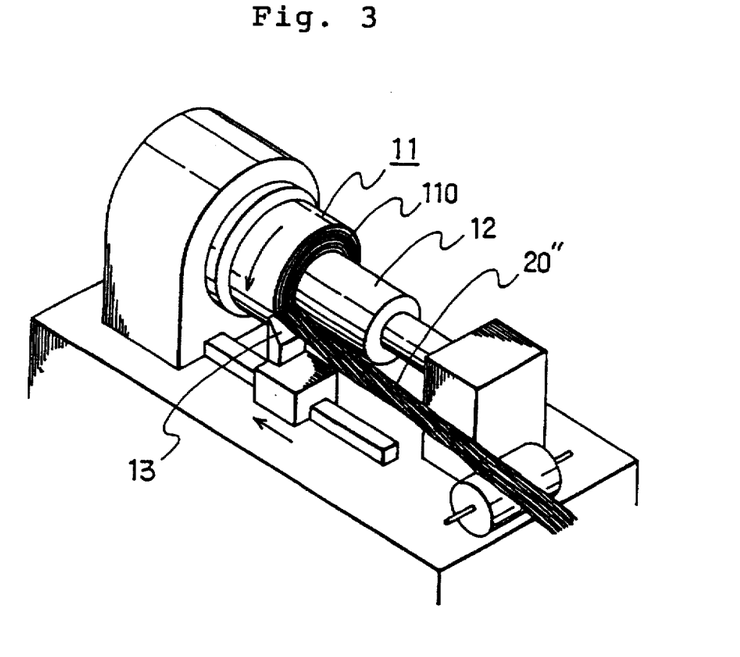
FIG. 3 is a drawing that shows a method of producing high-temperature heat-resistant stainless steel fibers.

FIGS. 1, 2, and 3 show embodiments of the filter for the treatment of carbon-based particles in exhaust gas according to the present invention.

A filter 1 for the treatment of carbon-based particles provides a sintered body 2 of high-temperature resistant stainless steel fibers 2 and electrodes fixed by welding etc. to the free ends thereof.

In FIG. 1 (a), a sintered body 2 of high-temperature resistance stainless steel fibers is in the form of a strip and is in the shape of wavy curves at required intervals. In FIG. 1 (b), it takes a cylindrical shape in which a part in the circumferential direction is cut open. In FIG. 1 (c), it takes a sectional star-like tubular shape, in which a part in the circumferential direction is cut open. The sintered body is not limited to such a shape. It can optionally take any shape, such as a plate, a tubular shape having a closed section, a cup-like shape, or a dish-like shape.

As in FIG. 1 (a), electrodes 3, 3 are provided on all parts of the free ends, or, as in FIGS. 1 (b) and (c), it has strips 30 attached along the free ends. If the regeneration method conducted when clogging occurs does not apply an electric current, the electrodes 3, 3 need not be provided.

For a sintered body of high-temperature resistant stainless steel fibers 2, it is desirable to use such a material in which resistance heat-generating is caused by a current flow, as for example, Fe—Cr—Al—REM-based stainless steel. Specifically, a stainless steel may contain by weight ratio 17–21% of Cr, 2.5–6.0% of Al, and 0.02–0.25 of REM, which may be one or more kinds of substances selected from the group consisting of La, Y, and Ce.

When the content of Cr or Al is less than the lower limit the thickness of the alumina coating becomes insufficient for the heat-resistant properties that will be described below. When the content is more than the upper limit the crystalline structure of the sintered body becomes unstable. REM contributes to the stability of an alumina coating. When the REM content is less than the lower limit the above function is not displayed. A content of more than the upper limit is economically improper.

As other components, 0.008% or less of C, 1.0% or less of Si, and 1.0% or less of Mn, may be contained in the sintered body.

As in FIG. 2 (a), a sintered body 2 of high-temperature resistant stainless steel fibers consists of a porous structure in which high-temperature resistant stainless steel fibers 20 are randomly oriented and the contacted parts are fused. As in FIG. 2 (b), the cross section prependicular to the axial direction of each sintered high-temperature resistant stainless steel fiber 20 is of a roughly quadrangular shape, and has a surface of a deposited thin alumina coating 21 having a uniform thickness.

As in FIG. 2 (c), the alumina coating 21 on the part 200 where high-temperature resistant stainless steel fibers 20 and 20 cross and contact is so formed that the coating encloses the fibers. The crossed contact part 200 has a metallic touch. Due to the metallic touch of the crossed contact part, the entire sintered body 2 of high-temperature resistant stainless steel fibers is in the state of a uniform resistance heat-generating circuit.

In one embodiment a catalyst layer 4 is further provided on the alumina coating 21. The catalyst layer 4 consists of a carrier for a catalyst and an active metal. As the carrier for a catalyst, at least one kind of substance is selected from the group consisting of alumina, silica-alumina, zirconia-alumina, titania, mordenite, and zeolites such as ZSM-5. The particle diameter of the carrier for a catalyst is preferably 0.5 μm to 20 μm, and more preferably 1 μm to 10 μm.

This is because it is difficult to produce a carrier having a particle diameter of less than 0.5 μm, and when the particle diameter is more than 20 μm such problems are caused wherein the fine open pores 22 of the sintered body 2 are clogged or wherein a catalyst is separated from them.

As the active metal supported on a carrier, at least one kind of metal selected from the group consisting of the metals of Group 1, Group 2, Group 3b, Group 4b, Group 5b, Group 6b, Group 7b, or Group 8 of the periodic table, is preferably used. As the metal of Group 1, Li, Na, K, Rb, Cs, or Cu, is preferable. As the metal of Group 2, Mg, Ca, Ba, or Zn, is preferable. As the metal of Group 3b, La or Ce is preferable. As the metal of Group 4b, Zr, as the metal of Group 5b, V, as the metal of Group 6b, Mo, as the metal of Group 7b, Mn, and as the metal of Group 8, Fe, Co, Ni, Pd, or Pt, is preferable.

The ratio of the active metal supported on the carrier to the sintered body of high-temperature resistant stainless fibers is preferably 0.1–15 mg per 1 g of the sintered body, and more preferably 1–10 mg. When the amount is more than 15 mg the fine-diameter pores are clogged.

Each high-temperature resistant stainless fiber 20 is preferably 10–300 mm in length, and 5–200 μm in the dimension of one edge of the section prependicular to the axial direction (width t or thickness w), and more preferably 10–100 μm. When the dimension is less than 10 mm, little intertwining of fibers occurs, and when it is more than 300 mm the fibers are nonuniformly gathered and it is difficult to form uniform open pores.

When the dimension of one side of a section is less than 5 μm, ash in carbon-based particles or exhaust gas accumulates and tends to clog the open pores 22 and to make the mechanical strength or heat-resistant properties of the filter lower. When the thickness is more than 200 μm most of the carbon-based particles in exhaust gas pass through the filter, and the basic function as a filter is not fulfilled.

The sintered body 2 of high-temperature resistant stainless steel fibers contains the high-temperature resistant stainless steel fibers 20 in a weight per unit area of 300–5,000 g/m$^2$. When the weight per unit area is less than 300 g/m$^2$ the porosity is too high and most of the carbon-based particles in exhaust gas cannot be treated before passing through the filter, and when it is more than 5,000 g/m$^2$ the throughput treatment capacity for the carbon-based particles in exhaust gas does not increase and the use of a large amount of high-temperature resistant stainless steel fibers 20 becomes uneconomical.

Since the starting material of high-temperature resistant stainless steel is of a ferrite type, and has bad cold-processing properties, and thus it is difficult to make small-gauge wiring by the drawing method, no high-temperature resistant stainless steel fibers 20 have practically existed. Even by the melt-spinning method, the fiberization of high-temperature resistant stainless steel is difficult. By the wire-cutting method, the shapes of the fibers are unspecified and their yield is low. Vibration cutting has such a problem wherein only short fibers can be produced.

To resolve the above problems, in the present invention high-temperature resistant stainless steel fibers 20 are obtained by the method of cutting coiled material.

That is, as in FIG. 3, the fibers are produced by tightly winding a thin stainless-steel plate (foil) 11 to form a coil around the turning main spindle 12, and cutting the end 110 of the coiled material 11 by a tool 13 in a predetermined depth of cut, to which tool 13 is applied a feed parallel to the turning main spindle.

Accordingly, a bundle 20" of long high-temperature resistant stainless steel fibers that is three-dimensional and properly curled is run off backwards along the cutting face and is continuously produced. Said fiber bundle is spread in the lateral direction and the spread fiber bundle is cut in lengths of 10 mm to 300 mm to obtain high-temperature resistant stainless steel fibers 20'.

Figure 4:
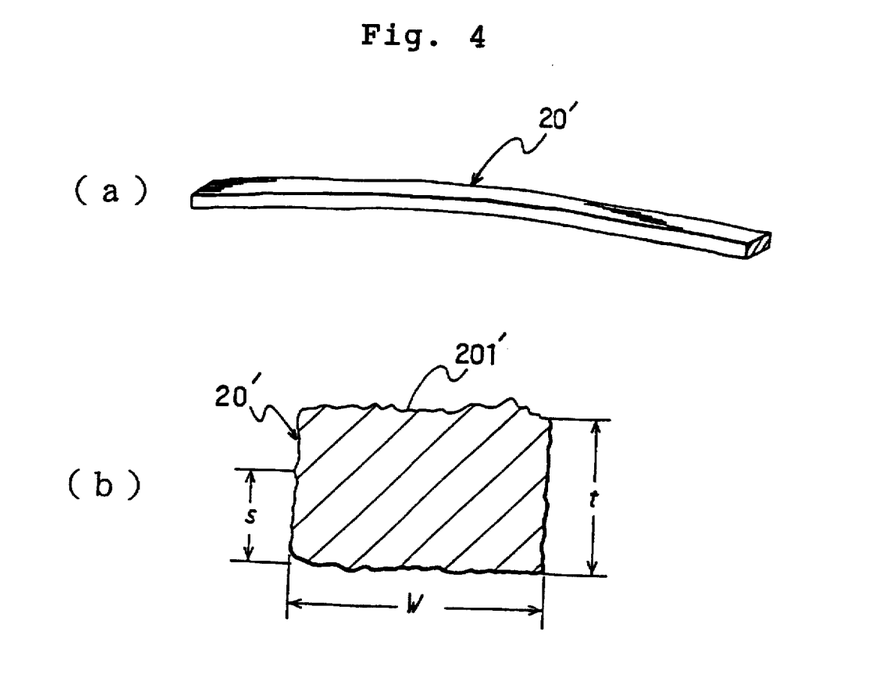

FIGS. 4 (a) and (b) show a single high-temperature resistant fiber 20', in which the cross section of the fiber is in a quadrangular shape, and one side 201 has a wrinkled and roughened surface.

By the method of cutting the end of a coiled material, one side of a high-temperature resistant stainless steel fiber 20' (the width of fiber W) corresponds to the thickness of a plate and one side (the thickness of a fiber t) is determined by the feed of a tool. Accordingly, by adjusting the thickness of a thin plate of a high-temperature resistant stainless steel 11 and depth of cut (feed of a tool) fibers having various dimensions can be produced.

As the conditions for the production of the above fibers, the rake of the tool may be from 15° to 45°, the cutting speed may be from 30–95 m/min., and the feed s may be from 5–40 μm/min.

The sintered body 2 of high-temperature resistant stainless steel fibers according to the present invention is generally produced by using the high-temperature resistant stainless steel fibers as a starting material and using the process of "web-making"-"sintering"-"shaping"-"heat-treating," or "web-making"-"sintering"-"shaping"-"heat-treating"-"supporting catalyst."

That is, first the high-temperature resistant fibers 20' are accumulated to a weight per unit area of 300 g/m² to 5,000 g/m² and then the accumulated fibers are formed to a required shape, for example, a web in the shape of a plate.

Then the thus-obtained web is heated at 800°–1250° C. under a vacuum or in a non-oxidizing atmosphere for 10 min. to 10 hours to be sintered. It is also preferable for the web to be loaded when it is sintered. From the thus-obtained sintered body a filter having the required dimensions is cut. When the shape of the filter is like that shown in FIG. 1, bending etc. is thereafter applied. However, according to circumstances, the shape of the filter exemplified in FIG. 1 may be formed when a web is being made.

Then the filter is heat-treated at a temperature from 600° C. to 1,000° C. in an oxidizing atmosphere such as air for 1–20 hours. That heat treatment may be conducted by electric current-applying heating, using the resistance heat-generating properties of the sintered body.

By that heat treatment, an alumina coating 21 as in FIGS. 2 (b) and (c) is deposited on the surface of the sintered fibers. When the temperature of the heat treatment is less than 600° C. the alumina coating 21 is insufficiently deposited, and when it is more than 1,100° C. the alumina is loosened and flies away.

In the above range of temperatures, a durable coating is produced, when the temperature is 700° C. or lower, by the reaction of $2(Fe, Cr, and Al)+4.5O_2 \rightarrow Fe_2O_3+Cr_2O_3+Al_2O_3$, and when it is higher than 700° C., by the reaction of $Fe_2O_3+2Al \rightarrow Al_2O_3+2Fe$. Additionally, since REM is added as one of the compositions, the stability of the alumina coating at high temperatures is improved, and thus good mechanical properties are shown at an operating temperature of 900° C. or less.

According to one embodiment of the present invention, after the heat treatment a catalyst is supported on a sintered body of high-temperature resistant stainless steel fibers 2. For the method of supporting a catalyst, any usual method can be used. For instance, it can be wash-coating a slurry prepared by impregnating an active metal in a catalyst carrier, wash-coating a slurry prepared by depositing an active metal on a catalyst carrier, or impregnating an active metal on a catalyst carrier after the carrier is wash-coated.

Since the filter 1 for treating carbon-based particles of the present invention comprises as the base material fibers that are produced at a low cost by cutting the end of a coiled material of high-temperature resistant stainless steel 11 it has the characteristics wherein it can be produced at a low cost while having uniform dimensions and high-temperature resistance. Also, since it is produced by not only gathering high-temperature resistant stainless steel fibers 20', forming them into a web, and sintering the web, but also by heat-treating the web after sintering to form an alumina coating on the surface of the fibers, it has high-temperature durability, antioxidation properties, and mechanical strength.

According to one embodiment of the present invention the filter has a catalyst layer 4 on the alumina film 21, which film 21 has an affinity for a catalyst carrier, and thus the adhesion of the catalyst layer 4 can be good. The catalyst can accelerate the combustion of carbon-based particles.

Since the pore diameter can be adjusted by varying the diameters of the fibers produced, varying the quantity of the fibers gathered to form a web, and, if a catalyst layer exists, varying the amount of the supported catalyst, such a filter can be produced in which no ash in carbon-based particles and no exhaust gas is deposited, besides enabling the throughput ratio of the carbon-based particles in exhaust gas to be properly changed. Thus the filter can be used over a long term.

Further, since high-temperature resistant stainless steel fibers 20 have a large surface area and a quadrilateral shape in cross section, besides the fact that their dimensions and shapes are uniform, carbon-based particles in exhaust gas can be securely captured on the edges of each fiber.

Below, the embodiments of the device for treating carbon-based particles in exhaust gas according to the present invention will be explained.

The device of the present invention is constituted by at least one carbon-based particles-.treating unit 5 (below it is just referred to as a treating unit), exemplified in FIGS. 5, 6, and 7.

Figure 8:
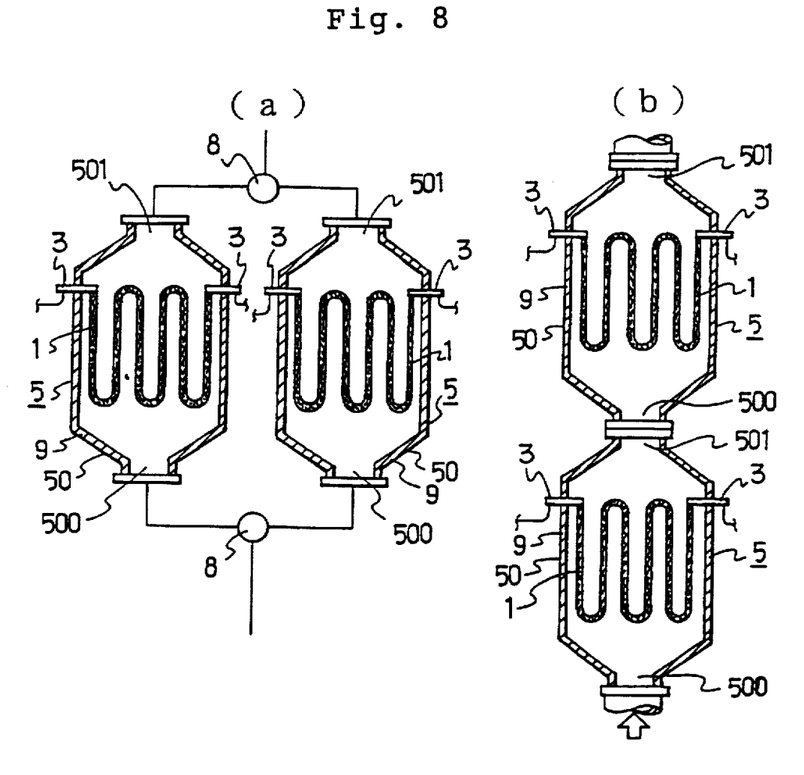

FIGS. 8 (a) and (b) exemplify devices for treating carbon-based particles in which plural treating units are used. FIG. 8 (a) shows a device in which plural treating units are connected in parallel in the passage for exhaust gas, switching valves 8 are provided upstream and downstream of the treating unit 5, and exhaust gas is selectively delivered to the treating unit 5. FIG. 8 (b) shows a device in which plural treating units 5 are connected in series in the passage for exhaust gas and the exhaust gas is subjected to a multistage treatment.

Figure 5:
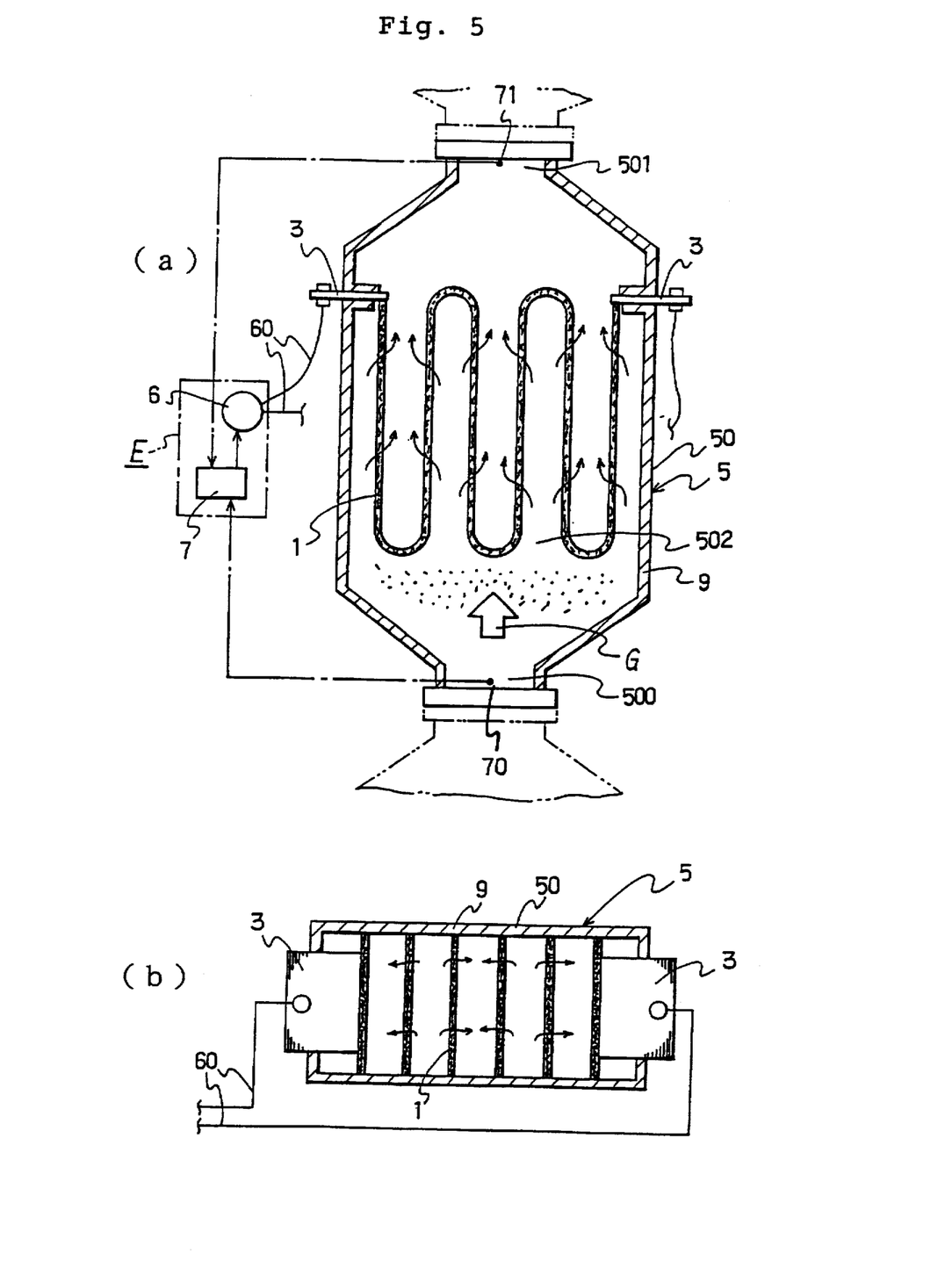

FIG. 5 shows an example of the device in which a filter 1 for treating the carbon-based particles shown in FIG. 1 (a) is used. A housing 50 of the device is constituted by a heat-resistant material such as stainless steel. It has a gas introduction part 500 at one end in the longer direction, and a discharge part 501 at the other end. In the inner surface of the housing 50 of the device a lining 9 having electricity-insulating properties and thermal-insulating properties is provided. A filter 1 for treating carbon-based particles is arranged in the passage for exhaust gas 502 between the introduction part 500 and the discharge part 501 such that electrodes 3, and 3 at the free ends protrude from the housing 50. Although actually the body of the device is divided into two parts, upper and lower parts, to fit electrodes 3, 3, it is shown simplified in some figures.

In FIG. 5, a device E is provided to supply electric current to produce a heat-generating reaction in the filter 1. The device E is provided with an electric source 6 and a controller 7. From the electric source 6 two electric supply lines 60, 60 extend, and one of the lines is connected to one of the electrodes and the other line is connected to the other electrode. The controller is electrically connected to the electric source.

Although the controller 7 may be a timer that makes the electric source act at each predetermined time, in the embodiment in FIG. 5, a microcomputer is used to which is connected an output side 70 of an exhaust gas pressure detector at the gas-introduction part 500 and an output side 71 of an exhaust gas pressure detector at the gas-discharge part 501. The differential pressure $P^3$ between the pressure of an introduced exhaust gas and that of the discharged gas is detected, and when the differential pressure $P^3$ reaches a predetermined value, the electric source 6 acts, or, further, the electric current flow is automatically controlled.

Figure 6:
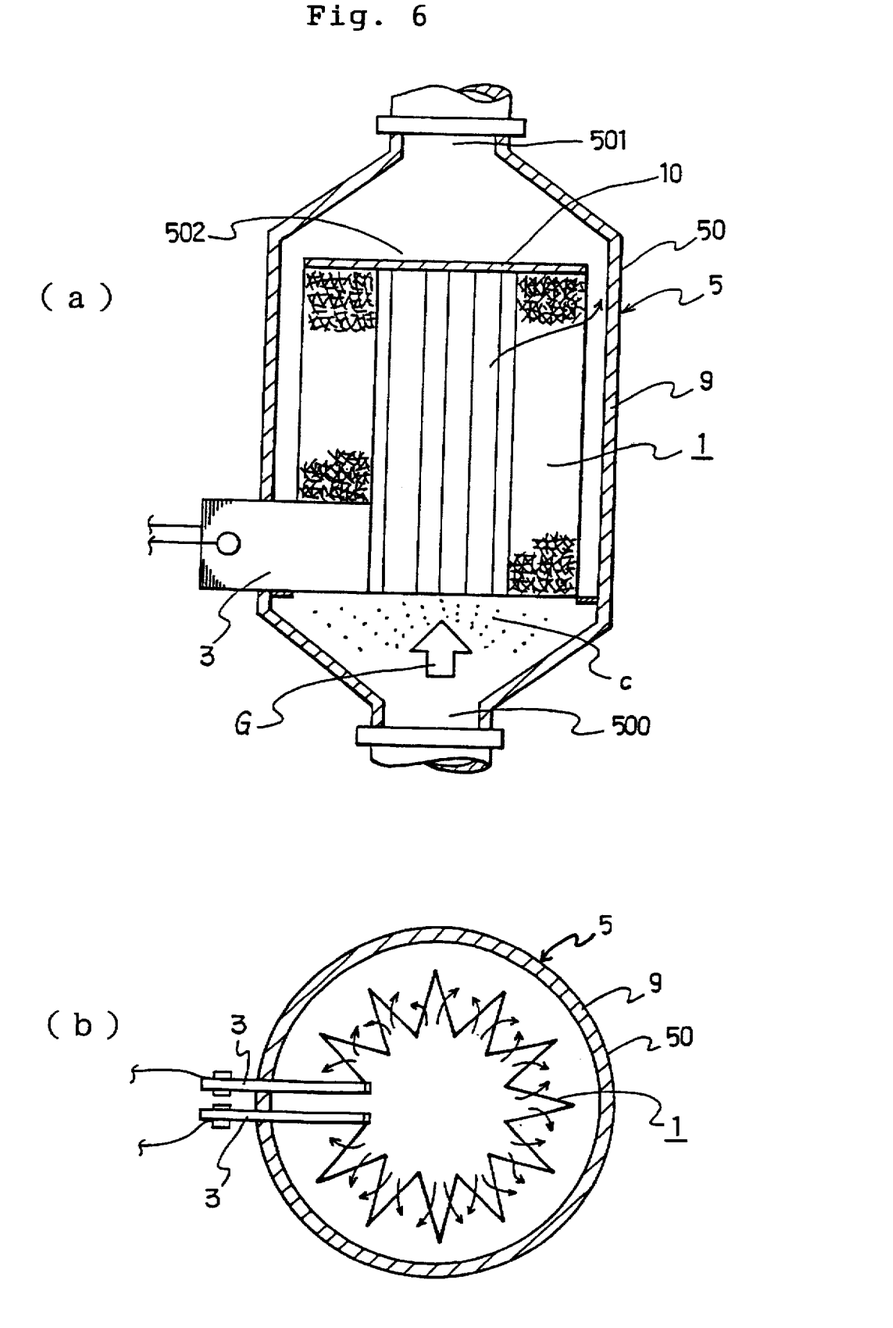
Figure 7:
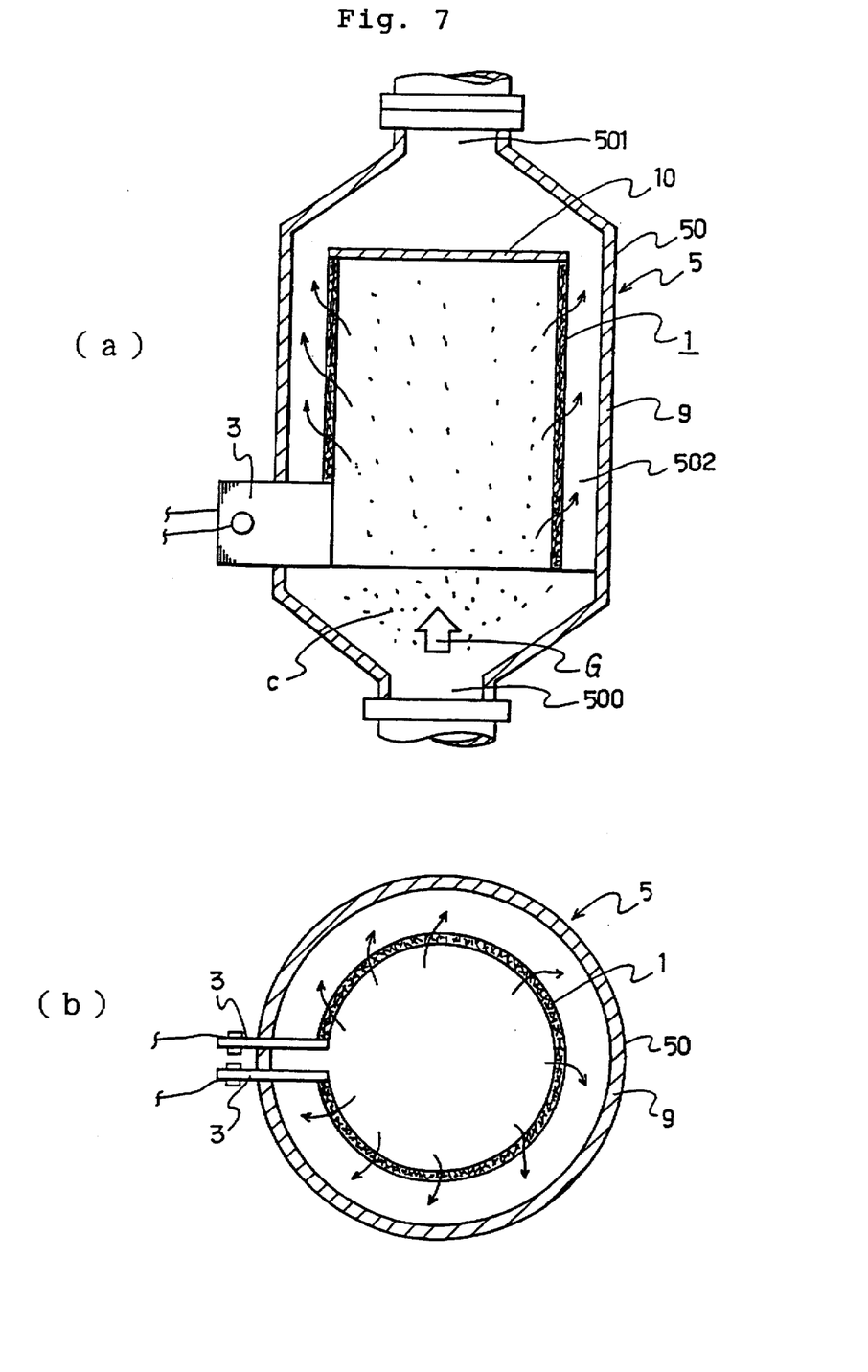

FIG. 6 shows an example in which the filter 1 for treating carbon-based particles shown in FIG. 1 (c) is used. FIG. 7 shows an example in which the filter 1 for treating carbon-based particles shown in FIG. 1 (b) is used.

In these examples, to capture carbon-based particles by having exhaust gas G flow laterally, the space between the lower end of the filter 1 and the inner wall of the lining is closed, and a capping material having heat-resistant and electricity-insulating properties is attached to the upper end of the filter to close it. Since the other constitutional elements are the same as those of the treating unit 5 in FIG. 5, an explanation for them is omitted here.

Since the shape of the filter 1 for treating carbon-based particles in the present invention can be freely determined, the surface area of the filter per unit volume of a treatment unit can be properly changed. Thus even in a device for treating an exhaust gas in which plural treating units 5 are connected in the passage for exhaust gas as in FIG. 8, it is possible to avoid applying a high back pressure to a diesel internal combustion engine or combustion equipment, or worsening a combustion state.

Accordingly, when a device for treating carbon-based particles in exhaust gas is constituted by a plurality of treating units 5, 5 the timing to apply electric current to each treating unit 5 may be shifted and thereby avoiding using too much electric power.

In the present invention the ways to install a filter 1 for treating carbon-based particles in a treating unit 5 are not limited to the aforementioned examples, but any way can be used, such as that of the multistage installation as in a single housing 50.

Below is explained the action of the device of the present invention for treating carbon-based particles in an exhaust gas.

A high-temperature exhaust gas G discharged from a diesel internal combustion engine or combustion equipment, containing carbon-based particles, passes from the exhaust gas-introduction part 500 through the passage 502 for an exhaust gas and the filter 1 for the treatment of carbon-based particles as shown by arrows, carbon-based particles c are captured, and cleaned exhaust gas is discharged from the exhaust part 501.

The filter 1 for the treatment of carbon-based particles of the present invention is constituted by a porous sintered body 2 of high-temperature resistant stainless steel fibers obtained by sintering high-temperature resistant fibers. The surface of the high-temperature resistant stainless steel fibers 20 is coated with a stable alumina film 21. Thus even in an oxidizing atmosphere it has a high mechanical strength and also shows excellent resistant properties. Also, high-temperature resistant stainless steel fibers 20 have large surface areas caused by the characteristics of the method for producing them, and are apt to catch carbon-based particles c a t their edges due to their quadrangular sectional shapes. Thus it can securely and efficiently capture the high-temperature carbon-based particles C discharged from a diesel internal combustion engine or combustion equipment.

In one embodiment of the present invention the filter ha s a catalyst layer 4 on the alumina film 21, said layer containing an active metal. Because of the presence of the catalyst layer, when the temperature of exhaust gas G is higher than the temperature at which the filter 1 can burn the carbon-based particles c, the carbon-based particles c in the exhaust gas are securely burnt on the filter 1. When the temperature of exhaust gas G is lower than the temperature at which the filter 1 can burn the carbon-based particles c, the carbon-based particles c are gradually captured on the filter and deposited such that the venting holes of the sintered body 2 of high-temperature resistant stainless steel fibers are covered with them.

Figure 9:
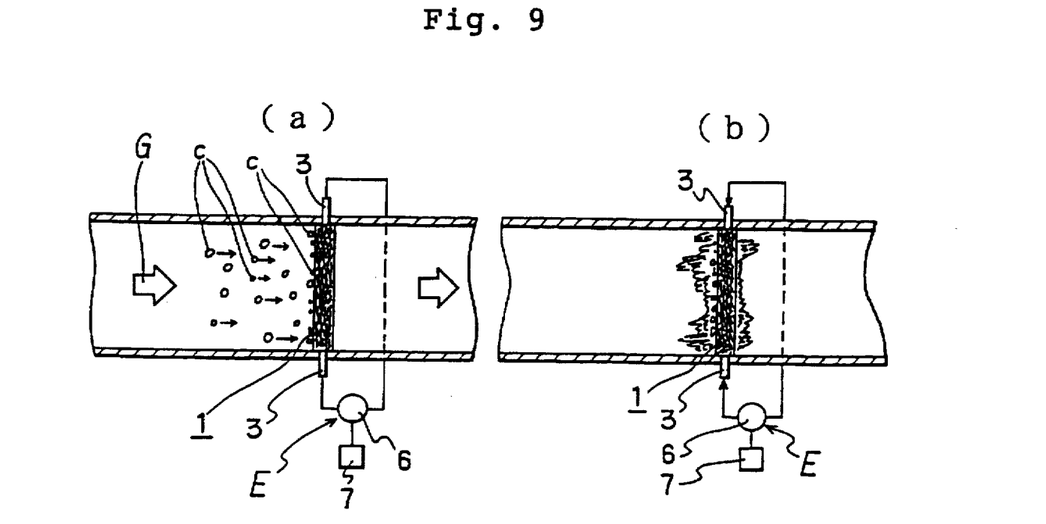

This state is shown in FIG. 9 (a). The deposition of the particles increases ventilation resistance, and this increases the pressure difference between the front of the filter 1 and the rear of it, and worsens the combustion performance of a diesel internal combustion engine or combustion equipment. Thus the carbon-based particles c captured in the filter 1 must be treated and the filter 1 must be regenerated.

Although as described above the regeneration of the filter can be conducted by burning carbon-based particles attached to the filter by an electric heater or burner and then propagatively burning them or by sending compressed air from the opposite direction to the exhaust gas stream and brushing the carbon-based particles, these methods are troublesome and lack certainty or take time for the treatment.

However, in the present invention the sintered body 2 of high-temperature resistant stainless steel fibers has resistance heat-generating properties when an electric current is applied, in addition to having a good thermal conductivity. Also, since high-temperature resistant stainless steel fibers 20 are directly joined at the crossing parts of the fibers, the sintered body 2 of high-temperature resistant stainless steel fibers has entirely uniform resistance heat-generating properties.

Thus, as above, when the pressure difference gets high, if electricity is applied from the electric source 6 of the device E through the electrodes 3, 3 to the filter 1 as in FIG. 9 (b), the entire filter 1 itself uniformly builds up Joule heat, and the carbon-based particles are definitely ignited by the heat to be burnt and removed. Thereby the pressure difference between the front and rear of the filter 1 returns to the initial state. When the filter 1 has a catalyst layer on the alumina film 21, the combustion of the carbon-based particles c is accelerated and lowers the amount of the electricity generated.

As is clear from the above, since the regeneration of the filter is conducted with the heat build-up of the filter itself that is caused by an electric current through it, no cinders are produced. Also, because of the good resistant properties due to the alumina film 21, the filter 1 of the high-temperature resistant stainless steel fibers 20 has no breakage, nor does any melting occur.

When the controller 7 is a timer, the regeneration procedure is conducted by automatically causing the electric source 6 to act at intervals that are set based on the results obtained in advance by conducting experiments. When the controller provides a differential pressure gauge the regeneration procedure is conducted by automatically causing the electric source 6 to act when the pressure difference shown by the signals on the pressure gauges for the exhaust gas 70 and 71 reaches certain predetermined differential pressure Ps.

Example 1

A Fe—Cr—Al—REM-based thin stainless sheet consisting of 0.004% of C, 0.14% of Si, 0.13% of Mn, 20.02% of Cr, 4.9% of Al, 0.08% of La, and the remainder of iron and unavoidable impurities, and having a thickness of 20 μm, was coiled around the main spindle, and the coiled sheet was cut at a feed per revolution of 10 μm/min. while the spindle was rotated to produce Fe—Cr—Al—REM-based long stainless fibers having a section of 30 μm×15 μm. The long fibers, were cut to have a length of 150 mm, the cut fibers were gathered to have a weight of 2,000 g/m², and made into a web. The thus-obtained web was sintered in a nonoxidizing atmosphere at 1,120° for 2 hours under a load of 40 g/m². Then the sintered web was heat-treated at 1,000° C. for 6 hours to obtain a base body of a carbon-based particles-treating filter having a rectangular shape and dimensions of 500×900×0.8 mm.

The obtained filter was fixed midway in a pipe for the exhaust gas of a direct-injection-type diesel engine. A test was conducted to collect carbon-based particles in exhaust gas at 300° C.

The collection efficiency of the carbon-based particles was 61% when the differential pressure difference of the filter by water-gauge pressure was 200 mm. This collection efficiency was calculated based on the concentrations of the particles in the exhaust gas at the inlet and outlet of the filter.

Example 2

The method of Example 1 was followed to make a sintered body of a planar strip form having a thickness of 0.8 mm, width of 25 mm, and length of 900 mm. The sintered body was subjected to a corrugating processing and then a heat-treatment under the aforementioned conditions, to produce a filter body for treating carbon-based particles in the shape as in FIG. 5 (a). Copper-made electrodes were fixed to both ends of the filter body to obtain a filter for treating carbon-based particles.

The filter was placed in a housing made with stainless steel through an electricity-insulating and heat-insulating material. A control circuit and electric source were connected to the electrodes. A differential pressure gauge was connected to the control circuit, by which gauge the pressure difference between the pressure at the inlet of the exhaust gas and that of the outlet of the exhaust gas was measured.

The device for treating carbon-based particles produced as above was fixed midway in a pipe for exhaust gas of a direct-injection-type diesel engine. By the fixed filter a test was conducted for treating exhaust gas. The result of the test is as in FIG. 10.

Figure 10:
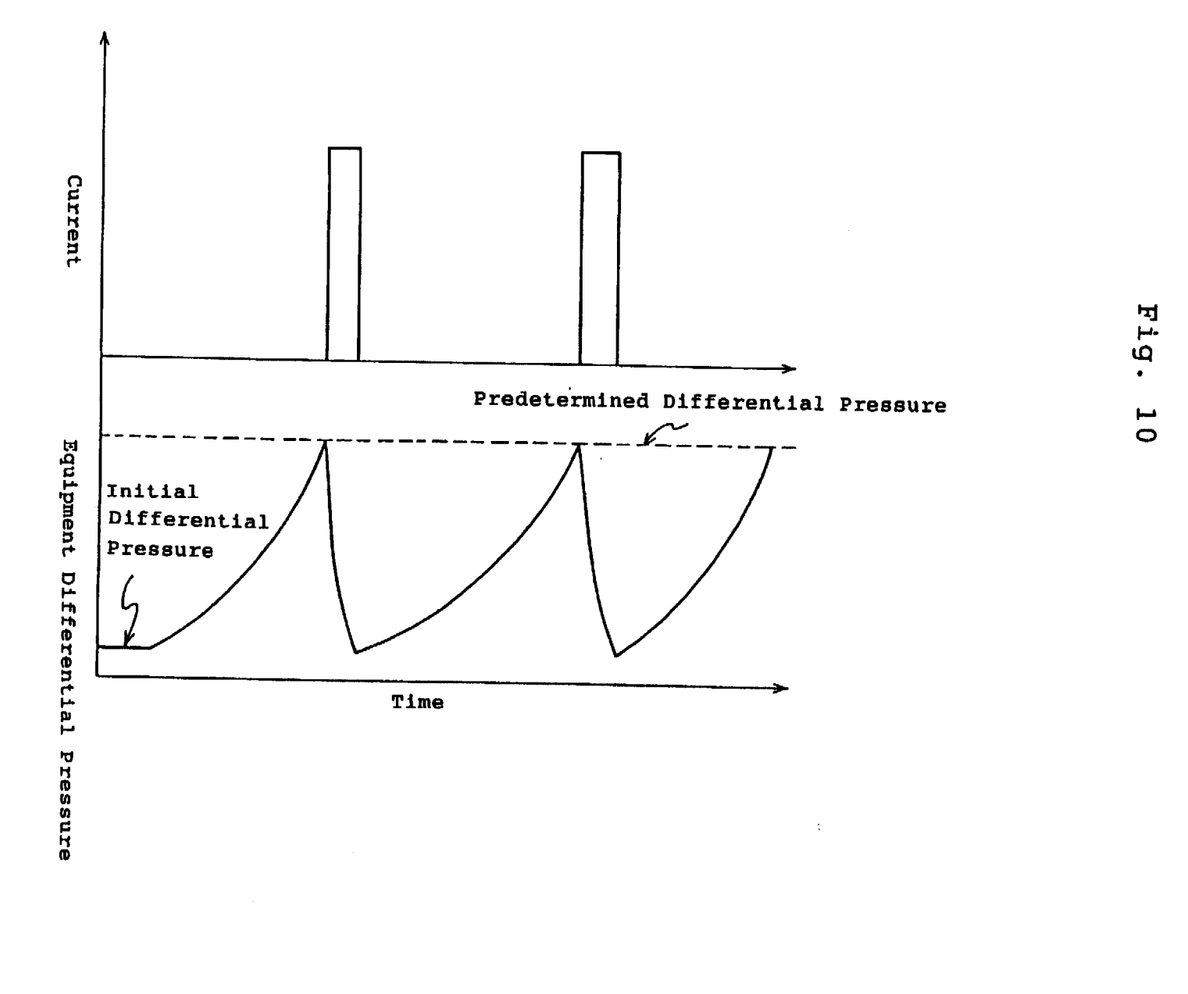
FIGS. 10, 11, and 12, are each a diagram showing the result of a test conducted by using a device for treating carbon-based particles of the present invention.

As in FIG. 10, as the filter for treating carbon-based particles collected them from the exhaust gas, the equipment differential pressure of the device for treating carbon-based particles gradually increased, and when that pressure reached the predetermined level, a current of 100 Å was applied from the control circuit through the electrodes to the carbon-based particles-treating filter. This resulted in decreasing the equipment differential pressure of the device to near the initial differential pressure. This procedure was repeated 1,000 times and the same changes were shown. At all those times the throughput rate of the treatment of carbon-based particles was 60–70%. Also, no melting nor failure occurred in the carbon-based particles-treating filter.

These results show that the device of the present invention has a high throughput capacity and a good durability.

Example 3

A base body of a filter for treating carbon-based particles was produced in the same way as for the filter in Example 1.

Copper sulfate was impregnated in alumina particles having a particle diameter of 1 μm. The impregnated product was ground and dried at 110° C. The dried product was sintered at 500° C. The sintered product was mixed with water, and the mixture was ground in a ball mill to prepare a 5% slurry. The base body of the filter was wash-coated with the slurry and dried at 100° C., and the dried product was sintered at 500° C. This procedure of wash-coating and sintering was repeated until 3 mg of copper per g of the base body of the filter was supported to obtain the carbon-based particles-treating filter.

Example 4

A base body of a carbon-based particles-treating filter was produced in the same way as for the filter in Example 1.

As a catalyst, alumina particles having a particle diameter of 1 μm were impregnated in chloroplatinic acid. The impregnated product was ground and dried. The dried product was sintered at 500° C. The sintered product was mixed with water, and the mixture was ground in a ball mill to prepare a 5% slurry. The base body of the filter was wash-coated with the slurry and dried at 110° C., and the dried product was sintered at 500° C. This procedure of wash-coating and sintering was repeated until 3 mg of platinum per g of the base body of the filter was supported to obtain the carbon-based particles-treating filter.

Example 5

To test the performance of the filters obtained in Examples 3 and 4, each filter was fixed midway in an exhaust gas pipe of a direct-injection-type diesel engine. A test was conducted for collecting carbon-based particles in exhaust gas until the pressure difference of the filter became 200 mm in terms of water-gauge pressure. The results are shown in Table 1.

A gas obtained by mixing 10% of oxygen and 90% of nitrogen was passed through each filter while the temperature of the gas was increased at a rate of 20° C./min. From the temperature of the filter and the differential pressure, the ignition temperature of the carbon-based particles that were collected in the filter and the temperature at which the particles burned off were measured. The results are shown in Table 2.

TABLE 1

|  | Catalyst | Collection coefficient |
|---|---|---|
| Example 3 | Cu/alumina | 73% |
| Example 4 | Pt/alumina | 76% |

TABLE 2

|  | Catalyst | Ignition Temperature | Burn-off Temperature |
|---|---|---|---|
| Example 3 | Cu/alumina | 450° C. | 550° C. |
| Example 4 | Pt/alumina | 500° C. | 600° C. |

From Table 1 it is found that the filter of the present invention has a high collection coefficient. Also, from Table 2 it is found that the filters of Examples 3 and 4 are low in both ignition temperature and burn-off temperature.

Example 6

The method of Example 1 was followed to make a sintered body of a planar strip form having a thickness of 0.8 mm, width of 25 mm, and length of 900 mm. The sintered body was subjected to a corrugating processing and then a heat-treatment under the aforementioned conditions, and the catalyst was supported as in Examples 3 and 4 to produce a filter body for treating carbon-based particles in the shape shown in FIG. 5 (a). Copper-made electrodes were fixed to both ends of the filter body to obtain a carbon-based particles-treating filter.

The filter was positioned in a housing made with stainless steel through an electricity- and heat-insulating material. A device for supplying an electric current consisting of a control circuit and electric source was connected to the electrodes. A differential pressure gauge was connected to the control circuit, by which gauge the pressure difference between the pressure at the inlet of the exhaust gas and that of the outlet of the exhaust gas was measured.

The device for treating carbon-based particles produced as above was fixed midway in a pipe for exhaust gas of a direct-injection-type diesel engine. By using the device in which the filter in Example 3 was provided a test was conducted for treating exhaust gas having a temperature of 550° C. or more. The result of the test is shown in FIG. 11.

Figure 11:
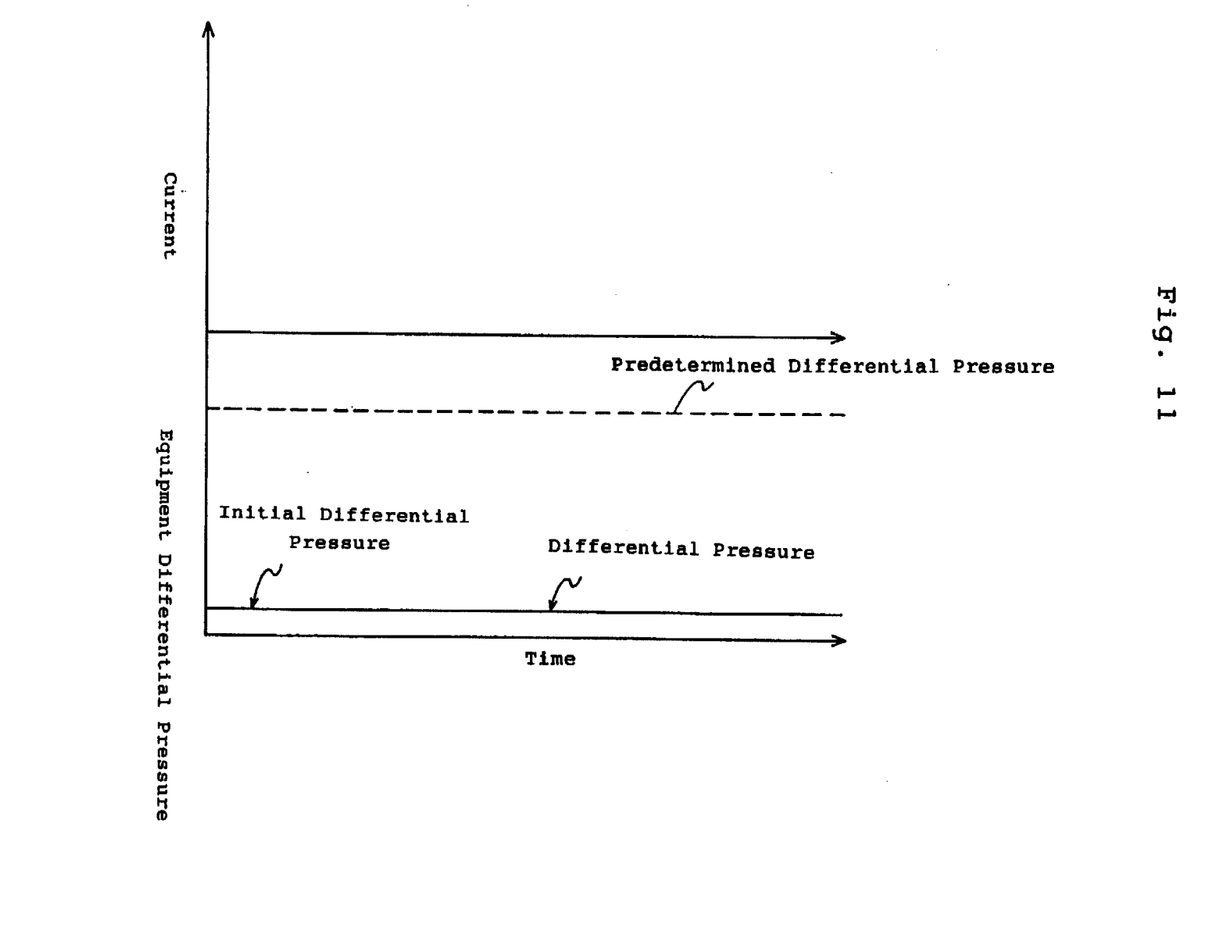

As in FIG. 11, the equipment differential pressure of the device for treating carbon-based particles did not increase and was constant at the initial differential pressure. In this case the throughput coefficient for the carbon-based particles was 70–80%.

Example 7

Figure 12:
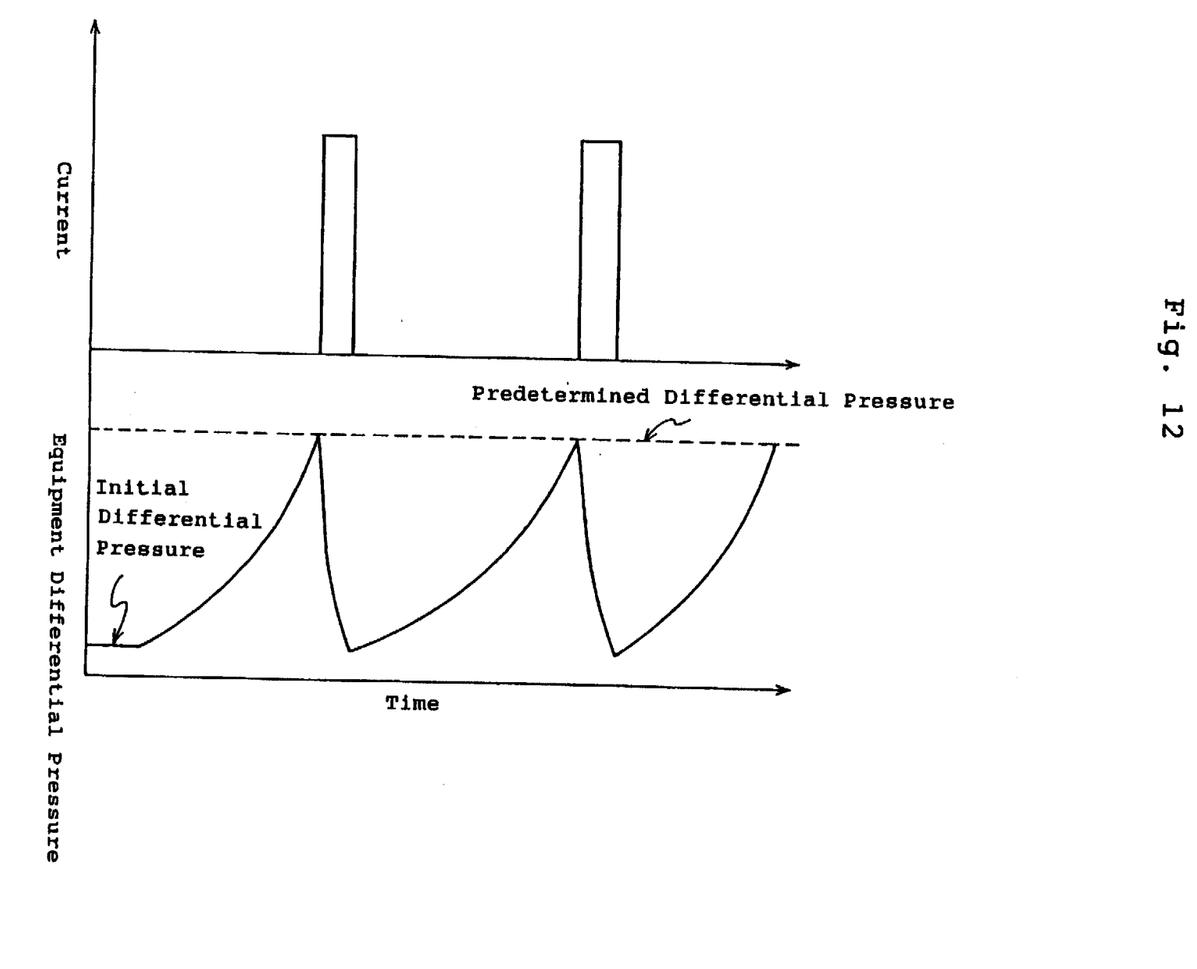

FIG. 12 shows the results of the test conducted when the temperature of the exhaust gas was 350° C., using the device in which the filter of Example 3 was provided.

As in FIG. 12, as the filter for treating carbon-based particles collected them from exhaust gas the equipment differential pressure of the device for treating carbon-based particles gradually increased, and when it reached the predetermined differential pressure an electric current of 100 Å was applied to the filter for treating carbon-based particles through the electrodes from the control circuit. It resulted in the decrease in the equipment differential pressure of the device to near the initial differential pressure. This procedure was repeated 1,000 times, and similar changes in the differential pressure were shown. At all those times the throughput rate of the carbon-based particles was 70–80%. Also, no melting nor failure occurred in the carbon-based particles-treating filter.

We claim:

1. A filter for treating carbon-based particles in exhaust gas characterized by consisting of a sintered body of high-temperature resistant stainless steel fibers produced by cutting an end face of a coiled material that is obtained by winding a sheet of a high-temperature resistant stainless steel having resistance heat-generating properties to produce fibers, gathering the fibers to form a web, sintering the web, and heat-treating the sintered web to form an alumina film on the sintered fibers.

2. A device for treating carbon-based particles in exhaust gas characterized by providing one or more treatment units for carbon-based particles, which treatment unit is provided with a housing of a device having an introduction part and a discharge part, a filter for treating carbon-based particles in exhaust gas consisting of a sintered body of high-temperature resistant stainless steel fibers produced by cutting an end face of a coiled material that is obtained by winding a sheet of a high-temperature resistant stainless steel having resistance heat-generating properties to produce fibers, gathering the fibers to form a web, sintering the web, and heat-treating the sintered web to form an alumina film on the sintered fibers and electrodes fixed to the free ends of the sintered body, and a device for applying an electric current to the electrodes when necessary to cause the filter to generate heat.

3. A filter for treating carbon-based particles in exhaust gas characterized by consisting of a sintered body of high-temperature resistant stainless steel fibers produced by cutting an end face of a coiled material that is obtained by winding a sheet of a high-temperature resistant stainless steel having resistance heat-generating properties, gathering the produced fibers, to form a web, sintering the web, heat-treating the sintered web to form an alumina film on the sintered fibers, and causing a catalyst to be supported on the alumina film.

4. A device for treating carbon-based particles in exhaust gas characterized by providing one or more treatment units for carbon-based particles, each of which treatment units is provided with a housing of a device having an introduction part and a discharge part, a filter for treating carbon-based particles in an exhaust gas consisting of a sintered body of high-temperature-resistant stainless steel fibers consisting of sintered fibers produced by cutting an end face of a coiled material that is obtained by winding a sheet of a high-temperature resistant stainless steel having resistance heat-generating properties, gathering the produced fibers to form a web, sintering the web, and heat-treating the sintered web to form an alumina film on the surface of the sintered fibers, and causing a catalyst to be supported on the alumina film and electrodes fixed to the free ends of the sintered body, and a device for applying an electric current to the electrodes when necessary to cause the filter to generate heat.

* * * * *